(12) United States Patent
Maekawa et al.

(10) Patent No.: US 7,641,328 B2
(45) Date of Patent: *Jan. 5, 2010

(54) INK FOR INK JET RECORDING

(75) Inventors: Shunji Maekawa, Wakayama (JP); Hiroki Tanaka, Wakayama (JP)

(73) Assignee: Kiwa Chemical Industry Co., Ltd., Wakayama (JP)

(*) Notice: Subject to any disclaimer, the term of this patent is extended or adjusted under 35 U.S.C. 154(b) by 204 days.

This patent is subject to a terminal disclaimer.

(21) Appl. No.: 10/487,865

(22) PCT Filed: Dec. 9, 2002

(86) PCT No.: PCT/JP02/12883

§ 371 (c)(1), (2), (4) Date: Feb. 26, 2004

(87) PCT Pub. No.: WO03/052009

PCT Pub. Date: Jun. 26, 2003

(65) Prior Publication Data

US 2004/0196343 A1    Oct. 7, 2004

(30) Foreign Application Priority Data

Dec. 18, 2001   (JP) .............................. 2001-384789

(51) Int. Cl.
*C09D 11/00* (2006.01)
(52) U.S. Cl. ..................................... 347/100; 106/31.13
(58) Field of Classification Search ................. 347/100; 106/31.13
See application file for complete search history.

(56) References Cited

U.S. PATENT DOCUMENTS

| | | | | |
|---|---|---|---|---|
| 4,205,991 A | | 6/1980 | Becker et al. .................. 106/22 |
| 4,680,235 A | * | 7/1987 | Murakami et al. ........ 428/32.18 |
| 4,689,078 A | * | 8/1987 | Koike et al. ............... 106/31.33 |
| 5,122,187 A | | 6/1992 | Schwarz et al. |
| 5,484,475 A | | 1/1996 | Breton et al. ............. 106/20 C |
| 5,488,907 A | | 2/1996 | Xu et al. ..................... 101/488 |
| 5,593,486 A | | 1/1997 | Oliver et al. |
| 5,623,296 A | * | 4/1997 | Fujino et al. ................ 347/103 |
| 5,830,263 A | | 11/1998 | Hale et al. ................ 106/31.27 |
| 5,858,075 A | * | 1/1999 | Deardurff et al. ........ 106/31.27 |
| 6,013,124 A | | 1/2000 | Saibara et al. ............ 106/31.86 |
| 6,153,263 A | * | 11/2000 | Haruta et al. ................ 427/261 |
| 6,607,565 B1 | | 8/2003 | Herrmann et al. |
| 6,770,331 B1 | * | 8/2004 | Mielke et al. ................ 427/496 |
| 7,234,805 B2 | * | 6/2007 | Maekawa et al. ............ 347/100 |
| 7,237,886 B2 | * | 7/2007 | Maekawa et al. ............ 347/100 |
| 2001/0000054 A1 | * | 3/2001 | Maeda et al. .................. 347/17 |
| 2002/0050221 A1 | | 5/2002 | Xu et al. |

FOREIGN PATENT DOCUMENTS

| | | |
|---|---|---|
| EP | 0 739 957 A1 | 10/1996 |
| EP | 0 924 272 | 6/1999 |
| EP | 924272 | 6/1999 |
| EP | 924272 A1 * | 6/1999 |
| EP | 1 174 436 A1 | 1/2002 |
| EP | 1 243 625 | 9/2002 |
| EP | 1243625 | 9/2002 |
| GB | 2 221 916 | 2/1990 |
| JP | 54-74105 A | 6/1979 |
| JP | 59-4665 | 1/1984 |
| JP | 61-10509 | 3/1986 |
| JP | 8-41396 | 2/1996 |
| JP | 8-73787 | 3/1996 |
| JP | 10-95944 | 4/1998 |
| JP | 10-505019 | 5/1998 |
| JP | 10-251579 | 9/1998 |
| JP | 2000-265098 | 9/2000 |
| JP | 2000-351924 A | 12/2000 |
| JP | 2001-329195 A | 11/2001 |
| JP | 2003-3098 | 1/2003 |
| JP | 2003-147244 | 5/2003 |
| WO | WO 99/28397 A1 | 6/1999 |

OTHER PUBLICATIONS

English translation of International Preliminary Examination Report.
Supplementary European Search Report dated Dec. 29, 2005 issued in corresponding European Patent Application No. 03791217.7.
Supplementary European Search Report dated Jan. 16, 2006 issued in corresponding European Patent Application No. 03791216.9.

* cited by examiner

*Primary Examiner*—Manish S Shah
*Assistant Examiner*—Laura E Martin
(74) *Attorney, Agent, or Firm*—Westerman, Hattori, Daniels & Adrian, LLP

(57) ABSTRACT

An ink for ink jet recording includes water, a water-soluble organic solvent, a water-insoluble color material, a dispersant, and a compound expressed by the following chemical formula:

$$R-O-(CH_2CH_2O)_n-H \quad (I)$$

where R is an alkyl group having a carbon number of 25 to 150 and n is from 2 to 100. The ink not only can maintain performances such as storage stability and high-quality recording images, but also can effectively prevent nozzle clogging, exhibit good dispersion stability, and achieve a high redispersion property that ensures stable ejection both during long continuous operation and after stopping the operation for a long time.

9 Claims, No Drawings

INK FOR INK JET RECORDING

TECHNICAL FIELD

The present invention relates to ink for ink jet recording in an ink jet recording system. Specifically, the present invention relates to ink for ink jet recording that uses a water-insoluble color material as a color component for a piezo ink jet system and can effectively prevent nozzle clogging of a recording head and have excellent storage stability.

BACKGROUND ART

Water-based ink for ink jet recording is used generally in the form of a water-soluble dye solution or a liquid obtained by dispersing a water-insoluble color material into water or an aqueous solution including a water-soluble organic solvent. When water resistance is required, hydrophobic fibers are dyed by ink jet textile printing, or hydrophobic fibers or resin film products are dyed by sublimation transfer after ink-jet printing on media such as papers, ink for ink jet recording that includes a water-insoluble color dye is used.

Characteristics required for the ink for ink jet recording that includes a water-insoluble color material are as follows: (1) ejection stability while preventing nozzle clogging; (2) storage stability; (3) high-quality recording images resulting from uniformity in the direction of ink ejected, the ejection amount, and the dot shape; (4) quick drying and fixation; and (5) high print density.

In an ink jet recording system, ink should be ejected from thin nozzles as ink droplets. Therefore, (1) is particularly important. When the ink jet recording system is of the drop-on-demand type, the ejection of ink from the nozzles is stopped temporarily even during continuous operation. This may lead to an ejection failure in long continuous operation.

Unlike a water-soluble dye, the water-insoluble color material tends to cause clogging, e.g., because precipitates (aggregates) are generated by the degradation of dispersion stability and the solvent evaporates from the nozzles. In particular, when the apparatus is not operated for a long-time, clogging is likely to occur due to evaporation of the solvent.

To suppress evaporation of the solvent, a low-volatile solvent or humectant is added. Alternatively, a hydrotropic agent is added so that even if a portion of the solvent included in the ink evaporates, the ink can be redispersed when it comes into contact with ink supplied further from an ink chamber. Examples of the humectant include glycols such as glycerin and polyethylene glycol. Examples of the hydrotropic agent include urea and urea compounds.

However, when used in a small amount, these additives are not effective, and when used in a large amount, the ink viscosity is raised or the surface tension is significantly changed, moreover, the drying property of printed materials is degraded.

To solve the above problems, e.g., JP 8-41396 A discloses that a solvent including water, glycerin, and propylene glycol is used to prevent nozzle clogging and to achieve quick-drying of the ink on a recording media after printing. In this document, when recording can be performed even after the nozzles are left for 120 seconds or more, the ink is regarded as being "excellent". However, the document is not sufficient to solve the issues of redispersion property and ejection performance of the ink after stopping the operation for a long time, e.g., after the nozzles are left overnight.

JP 10-251579 A discloses a technique to prevent clogging by using an ethylene glycol lower fatty acid ester compound that can improve the solubility of a dye in the ink and serve as a humectant. Although this technique can prevent clogging when a water-soluble dye is used as a colorant, it is not effective when a water-insoluble dye is used as a colorant.

JP 2000-265098 A discloses a technique to prevent the evaporation of a solvent by forming a liquid crystal structure at the gas-liquid interface with the addition of a polyoxyethylene alkyl ether compound that includes an alkyl group having a carbon number of 14 to 23. However, as is evident from a paragraph [0016] of the document, which states that "a water-soluble dye is preferred", the dispersion stability and redispersion property of the color material can be a problem when this technique is applied to a water-insoluble color material.

As an example of the use of a water-insoluble color material, JP 10-95944 A discloses a technique for producing an ink that includes a pigment, a humectant, and a long chain polyethylene oxide-containing dispersant. However, this technique also cannot prevent the precipitation of a solid matter made of the pigment and the dispersant. Therefore, excessive cleaning operation is necessary to wash off the solid matter.

To solve the above problems of a conventional ink for ink jet recording, an object of the present invention is to provide an ink for ink jet recording that not only can maintain required performances such as storage stability and high-quality recording images, but also can effectively prevent nozzle clogging, exhibit good dispersion stability, and achieve a high redispersion property that ensures stable ejection both during long continuous operation and after stopping the operation of an apparatus for a long time, even if a water-insoluble color material is used as a color component.

The present inventors have considered that when an ink composition has a high redispersion property such that it can be redispersed easily without any aggregation by the addition of a small amount of water even after drying, the ink composition can be reliable enough to prevent nozzle clogging of an ink jet head. The study conducted by the present inventors showed that the use of a specific compound can provide an ink with the above characteristics.

DISCLOSURE OF INVENTION (1) An ink for ink jet recording of the present invention including water, a water-soluble organic solvent, a water-insoluble color material, a dispersant, and a compound expressed by the following chemical formula:

$$R\text{—}O\text{—}(CH_2CH_2O)_n\text{—}H \qquad (I)$$

where R is an alkyl group having a carbon number of 25 to 150 and n is from 2 to 100.

(2) The ink for ink jet recording according to the item (1), wherein R is an alkyl group having a carbon number of 30 to 50 and n is from 10 to 50 in the chemical formula (I).

(3) The ink for ink jet recording according to the item (1) or (2), wherein HLB of the compound expressed by the chemical formula (I) is not less than 10.

(4) The ink for ink jet recording according to any one of the items (1) to (3), wherein the water-insoluble color material is a disperse dye or solvent dye.

(5) The ink for ink jet recording according to any one of the items (1) to (3), wherein the water-insoluble color material is a disperse dye.

(6) The ink for ink jet recording according to any one of the items (1) to (5), wherein the dispersant is at least one selected from the group consisting of an anionic surfactant, a nonionic surfactant, and a high-molecular surfactant.

(7) The ink for ink jet recording according to any one of the items (1) to (6), wherein the amount of the compound expressed by the chemical formula (I) is 0.1 to 8 wt % with respect to the total weight of ink.

(8) The ink for ink jet recording according to any one of the items (1) to (7), wherein the amount of the water-soluble organic solvent is 5 to 50 wt %, the amount of the water-insoluble color material is 0.5 to 15 wt %, the amount of the dispersant is 0.5 to 20 wt %, and the amount of the compound expressed by the chemical formula (I) is 0.1 to 8 wt % with respect to the total weight of ink.

DETAILED DESCRIPTION OF INVENTION

Unlike polyoxyethylene higher alkyl ethers used in a conventional ink for ink jet recording, the compound expressed by the chemical formula (I) of the present invention includes an alkyl group having a carbon number of not less than 25. The upper limit of the carbon number of the alkyl group generally is not more than 150. As a conventional example, natural or synthetic alcohol compounds have been commercially available. However, these compounds normally include an alkyl group having a carbon number of about 12 to 18. The above-described JP 2000-265098 A discloses a polyoxyethylene alkyl ether compound that includes an alkyl group having a carbon number of 14 to 23.

However, when a water-insoluble color material is used as a colorant, it is not possible to achieve an ink composition with a high redispersion property even by using the polyoxyethylene higher alkyl ethers having a carbon number of less than 25.

Hereinafter, the present invention will be described in more detail. In a compound expressed by the following chemical formula (I) of the present invention, R is an alkyl group having a carbon number of 25 to 150. The ink composition for ink jet recording can achieve a high redispersion property by using a compound that includes R having a carbon number of not less than 25. In view of solubility in a water-based ink composition, a compound that includes R having a carbon number of not more than 150 is appropriate. The carbon number of R (alkyl group) is preferably 30 to 50, and more preferably 30 to 35. Further, n ranges from 2 to 100, preferably 10 to 50, and more preferably 20 to 50. The alkyl group can be either linear or branched-chain, but a linear alkyl group is preferred.

In view of solubility in water, HLB is not less than 4, preferably not less than 10, and more preferably ranges from 14 to 18.

$$R\text{—}O\text{—}(CH_2CH_2O)_n\text{—}H \quad (I)$$

The compound expressed by the chemical formula (I) is used preferably in an amount of 0.1 to 8 wt %, more preferably 0.1 to 6 wt %, and even more preferably 0.2 to 4 wt % with respect to the total weight of ink. By adjusting the amount of the compound within the range of 0.1 to 8 wt %, the ink viscosity is not excessively high, so that the ink can provide an intended effect.

Examples of the compound expressed by the chemical formula (I) include the following products manufactured by Baker Petrolite Corporation in the U.S.: "UNITHOX 420" (R is a linear alkyl group having a carbon number of 31 to 32, n is about 3, and HLB is 4); "UNITHOX 450" (R is a linear alkyl group having a carbon number of 31 to 32, n is about 10, and HLB is 10); "UNITHOX 480" (R is a linear alkyl group having a carbon number of 31 to 32, n is about 40, and HLB is 16); "UNITHOX 520" (R is a linear alkyl group having a carbon number of 38, n is about 3, and HLB is 4); "UNITHOX 550" (R is a linear alkyl group having a carbon number of 38, n is about 12, and HLB is 10); "UNITHOX 720" (R is a linear alkyl group having a carbon number of 48 to 49, n is about 4, and HLB is 4); and "UNITHOX 750" (R is a linear alkyl group having a carbon number of 48 to 49, n is about 16, and HLB is 10).

Examples of the water-soluble organic solvent of the present invention include polyhydric alcohols such as ethylene glycol, diethylene glycol, propylene glycol, butylene glycol, triethylene glycol, tetraethylene glycol, polyethylene glycol, polypropylene glycol, thiodiglycol, and glycerin, glycol ethers such as ethylene glycol monomethyl ether, diethylene glycol monomethyl ether, diethylene glycol monoethyl ether, diethylene glycol monobutyl ether, and propylene glycol monomethyl ether, alcohols such as isopropyl alcohol, methanol, ethanol, and benzyl alcohol, and basic solvents such as N-methyl-2-pyrrolidone and triethanolamine.

Among these water-soluble organic solvents, glycerin, diethylene glycol, polyethylene glycol 300, polyethylene glycol 400, and propylene glycol are preferred. In particular, glycerin is suitable for a humectant.

They can be used individually or as a mixture of two or more solvents.

To adjust the ink viscosity and to prevent clogging by utilizing a moisture retention effect, the amount of the water-soluble organic solvent is preferably 5 to 50 wt %, more preferably 10 to 45 wt %, and even more preferably 15 to 40 wt % with respect to the total weight of ink.

Examples of the water-insoluble color material include a pigment, a disperse dye, and a solvent dye.

To maintain the dispersion stability of ink and to provide required print concentration, the amount of the water-insoluble color material is preferably 0.5 to 15 wt %, and more preferably 1 to 10 wt % with respect to the total weight of ink.

Examples of the pigment include organic pigments such as azo pigment, phthalocyanine pigment, quinacridone pigment, perinone pigment, perylene pigment, and inorganic pigments such as carbon black.

Examples of the disperse dye and the solvent dye include azo dye, anthraquinone dye, quinoline dye, quinophthalone dye, nitro dye, coumarin dye, styryl dye, methine dye, azomethine dye, xanthene dye, perinone dye, perylene dye, indoaniline dye, and phthalocyanine dye.

When polyester fibers or film products are dyed by sublimation dyeing after printing on papers, the disperse dye and the solvent dye are preferred. When polyester fibers are dyed directly by ink-jet textile printing, the disperse dye is particularly preferred because of its good affinity with and fixation onto the fibers.

The dispersant of the present invention disperses the water-insoluble color material into a water-based medium. There is no particular limitation to the dispersant as long as it can be used with the compound expressed by the chemical formula (I). For example, an anionic surfactant, a nonionic surfactant, or a high-molecular surfactant can be used as the dispersant. The anionic surfactant and the nonionic surfactant are suitable for the dispersion of the disperse dye or the solvent dye, and the anionic surfactant is particularly preferred. The high-molecular surfactant is suitable for the dispersion of the pigment.

Examples of the anionic surfactant include naphthalene sulfonate formaldehyde condensate, lignin sulfonates, special arylsulfonate formaldehyde condensate, creosote oil sulfonate formaldehyde condensate, and polyoxyethylene alkyl ether sulfate.

Examples of the nonionic surfactant include polyoxyethylene sorbitan fatty acid ester, polyoxyethylene alkyl ether, polyoxyethylene alkyl phenyl ether, polyoxyethylene derivatives, and oxyethylene oxypropylene block copolymers.

Examples of the high-molecular surfactant include polyacrylic partial alkyl ester, polyalkylene polyamine, polyacrylate, styrene-acrylic acid copolymers, vinylnaphthalene-maleic acid copolymers, polyphosphoric acid, polyvinyl alcohol, carboxyalkyl cellulose, polyvinyl pyrrolidone, and methacrylate derivatives.

To maintain good dispersion stability of the water-insoluble color material, the amount of the dispersant is preferably 0.5 to 20 wt %, more preferably 0.5 to 10 wt %, and even more preferably 0.5 to 5 wt % with respect to the total weight of ink.

In addition to the above materials, the ink of the present invention may include various additives, if necessary, so as not to impede the attainment of the object of the present invention. Examples of the additives include a surface control agent, a hydrotropic agent, a pH regulator, a viscosity modifier, a preservative, an antifungal agent, a light stabilizer, a chelating agent, an antifoaming agent, and an anti-curl agent.

When pigments are used as the water-insoluble color material, the ink may further include a binder.

Examples of the surface control agent include a fluorochemical surfactant, a polyether modified dimethylpolysiloxane, and acrylic polymers, and particularly the polyether modified dimethylpolysiloxane and the acrylic polymers are suitable for the present invention. These surface control agents are useful to control the surface tension of the ink so that a material for forming the ink flow passage is wetted easily when it comes into contact with the ink. The amount of the surface control agent is 0.05 to 1 wt %, and preferably 0.1 to 0.5 wt % with respect to the total weight of ink. When the amount is less than 0.05 wt %, the above effect is reduced. When the amount is more than 1 wt %, the above effect is not enhanced anymore.

A method for producing an ink for ink jet recording of the present invention is not particularly limited. For example, a preferred method includes the following:

(1) A water-insoluble color material, a compound expressed by the chemical formula (I), a dispersant, and water are mixed and stirred to prepare predispersions. In this case, a water-soluble organic solvent or any of the above additives may be added as needed.

(2) The predispersions are dispersed in a wet mill (e.g., a sand mill), thereby producing color material dispersions.

(3) To the color material dispersions are added water and a water-soluble organic solvent or, if necessary, any of the above additives, and then the concentration is adjusted. The resultant liquid is filtered, e.g., through a filter paper before use.

In this method, the compound expressed by the chemical formula (I) may be added either when the predispersions are pulverized or when the concentration is adjusted. Alternatively, the compound may be divided and added in both cases.

In view of workability, it is preferable that the compound expressed by the chemical formula (I) is added in the form of about 10 to 15 wt % of an aqueous solution that is prepared beforehand. In this case, water to be added may be reduced by the amount corresponding to the water contained in the aqueous solution.

The average particle size of the water-insoluble color material obtained by the above method is preferably not more than 1 μm, and more preferably ranges from 0.02 to 0.2 μm.

The foregoing explanation only gives some examples of solvent, color material, dispersant, or other components, and the present invention is not limited thereto.

Hereinafter, the present invention will be described in more detail by way of examples. However, the present invention is not limited to the following examples. In each of the examples, "parts" indicates "parts by weight" and "%" indicates "wt %" unless otherwise noted.

WORKING EXAMPLE 1

A mixture including 20 parts of red disperse dye dry cake (C. I. Disperse Red 60), 12 parts of sodium β-naphthalene sulfonate formaldehyde condensate ("DEMOL N" manufactured by Kao Corporation) which is an anionic surfactant used as a dispersant, 5 parts of "UNITHOX 480" (manufactured by Baker Petrolite Corporation and corresponding to a compound expressed by the chemical formula (I) where R is a linear alkyl group having a carbon number of 31 to 32, n is about 40, and HLB is 16), and 123 parts of water was prepared. This mixture was pulverized for 35 hours in a sand mill using 330 parts of zircon beads with a diameter of 0.4 mm, thus producing dispersions. To the dispersions were added 5 parts of "UNITHOX 480", 120 parts of glycerin that serves as a water-soluble organic solvent, 2.0 parts of polyether modified dimethylpolysiloxane ("BYK-348" manufactured by BYK-Chemie Japan) that serves as a surface control agent, and water, so that ink with an adjusted dye concentration of 5% was obtained. The average particle size of the dye was 0.10 μm.

WORKING EXAMPLE 2

A mixture was prepared and pulverized in the same manner as in Working Example 1 except that 20 parts of yellow disperse dye dry cake (C. I. Disperse Yellow 54) were used instead of the red disperse dye dry cake, thus producing dispersions. To the dispersions were added 25 parts of "UNITHOX 480" that corresponds to a compound expressed by the chemical formula (I), 300 parts of glycerin that serves as a water-soluble organic solvent, 2.5 parts of "BYK-348" that serves as a surface control agent, and water, so that ink with an adjusted dye concentration of 2% was obtained. The average particle size of the dye was 0.12 μm.

WORKING EXAMPLE 3

A mixture including 20 parts of blue disperse dye dry cake (C. I. Disperse Blue 72), 12 parts of special sodium arylsulfonate formaldehyde condensate ("DEMOL SN-B" manufactured by Kao Corporation) which is an anionic surfactant used as a dispersant, 5 parts of "UNITHOX 480" that corresponds to a compound expressed by the chemical formula (I), and 123 parts of water was prepared. This mixture was pulverized in the same manner as in Working Example 1 by using 330 parts of zircon beads with a diameter of 0.4 mm, thus producing dispersions. To the dispersions were added 15 parts of "UNITHOX 480", 180 parts of glycerin that serves as a water-soluble organic solvent, 2.4 parts of acrylic polymer ("BYK-381" manufactured by BYK-Chemie Japan) that serves as a surface control agent, and water, so that ink with an adjusted dye concentration of 3.3% was obtained. The average particle size of the dye was 0.08 μm.

WORKING EXAMPLE 4

A mixture was prepared and pulverized in the same manner as in Working Example 1 to produce dispersions. To 40 parts of the dispersions were added 10 parts of "UNITHOX 480" that corresponds to a compound expressed by the chemical formula (I), 120 parts of glycerin that serves as a water-soluble organic solvent, 0.4 parts of "BYK-348" that serves as a surface control agent, and water, so that ink with an adjusted dye concentration of 1.25% was obtained.

WORKING EXAMPLE 5

A mixture including 20 parts of red disperse dye dry cake (C. I. Disperse Red 60), 12 parts of special sodium arylsulfonate formaldehyde condensate ("DEMOL SN-B" manufactured by Kao Corporation) which is an anionic surfactant used as a dispersant, 3 parts of "UNITHOX 480", and 125 parts of water was prepared. This mixture was pulverized for 35 hours in a sand mill using 330 parts of zircon beads with a diameter of 0.4 mm, thus producing dispersions.

To the dispersions were added 120 parts of glycerin that serves as a water-soluble organic solvent, 2.0 parts of polyether modified dimethylpolysiloxane ("BYK-348" manufactured by BYK-Chemie Japan) that serves as a surface control agent, and water, so that ink with an adjusted dye concentration of 5% was obtained. The average particle size of the dye was 0.10 µm.

WORKING EXAMPLE 6

A mixture was prepared and pulverized in the same manner as in Working Example 5 except that 20 parts of yellow disperse dye dry cake (C. I. Disperse Yellow 54) were used instead of the red disperse dye dry cake, 4 parts of "UNITHOX 480" were used, and 124 parts of water were used, thus producing dispersions. To the dispersion were added 300 parts of glycerin that serves as a water-soluble organic solvent, 2.5 parts of "BYK-348" that serves as a surface control agent, and water, so that ink with an adjusted dye concentration of 2% was obtained. The average particle size of the dye was 0.12 µm.

WORKING EXAMPLE 7

A mixture was prepared and pulverized in the same manner as in Working Example 5 to produce dispersions. To 40 parts of the dispersions were added 3.3 parts of "UNITHOX 480" that corresponds to a compound expressed by the chemical formula (I), 120 parts of glycerin that serves as a water-soluble organic solvent, 0.4 parts of "BYK-348" that serves as a surface control agent, and water, so that ink with an adjusted dye concentration of 1.25% was obtained.

COMPARATIVE EXAMPLE 1

Ink was produced in the same manner as in Working Example 1 except that sodium β-naphthalene sulfonate formaldehyde condensate ("DEMOL N" manufactured by Kao Corporation) was used in equal amount instead of the "UNITHOX 480" in Working Example 1.

COMPARATIVE EXAMPLE 2

Ink was produced in the same manner as in Working Example 1 except that polyoxyethylene higher alkyl ether ("EMULGEN 707" manufactured by Kao Corporation) which is a nonionic surfactant made of alcohol having a carbon number of less than 25 was used in equal amount instead of the "UNITHOX 480" in Working Example 1.

COMPARATIVE EXAMPLE 3

Ink was produced in the same manner as in Working Example 1 except that polyoxyalkylene higher alkyl ether ("EMULGEN MS-110" manufactured by Kao Corporation) which is a nonionic surfactant made of natural alcohol having a carbon number of not more than 18 was used in equal amount instead of the "UNITHOX 480" in Working Example 1.

COMPARATIVE EXAMPLE 4

Ink was produced in the same manner as in Working Example 1 except that "UNITHOX 480" was used in equal amount instead of the "DEMOL N" in Working Example 1. The particle size of the dye was not less than 1 µm. When the ink thus produced was allowed to stand, the dye gradually aggregated to form precipitates. Therefore, it was not possible to use the ink for ink jet recording because storage stability was poor without a dispersant.

Table 1 shows the ratio of components other than water for each of the ink compositions in Working Examples 1 to 7 and Comparative Examples 1 to 3.

TABLE 1

Ink compositions in Working Examples and Comparative Examples (wt %)

| | Working Examples | | | | | | | Comparative Examples | | |
|---|---|---|---|---|---|---|---|---|---|---|
| | 1 | 2 | 3 | 4 | 5 | 6 | 7 | 1 | 2 | 3 |
| Y-54 | — | 2.0 | — | — | — | 2.0 | — | — | — | — |
| R-60 | 5.0 | — | — | 1.25 | 5.0 | — | 1.25 | 5.0 | 5.0 | 5.0 |
| B-72 | — | — | 3.3 | — | — | — | — | — | — | — |
| DEMOL N | 3.0 | 1.2 | — | 0.75 | — | — | — | 5.5 | 3.0 | 3.0 |
| DEMOL SN-B | — | — | 2.0 | — | 3.0 | 1.2 | 0.75 | — | — | — |
| UNITHOX 480 | 2.5 | 3.0 | 3.5 | 2.8 | 0.75 | 0.4 | 1.0 | — | — | — |
| EMULGEN 707 | — | — | — | — | — | — | — | — | 2.5 | — |
| EMULGEN MS-110 | — | — | — | — | — | — | — | — | — | 2.5 |
| Glycerin | 30 | 30 | 30 | 30 | 30 | 30 | 30 | 30 | 30 | 30 |
| BYK-348 | 0.50 | 0.25 | — | 0.10 | 0.50 | 0.25 | 0.10 | 0.50 | 0.50 | 0.50 |
| BYK-381 | — | — | 0.40 | — | — | — | — | — | — | — |

The following tests were conducted on each of the inks in Working Examples 1 to 7 and Comparative Examples 1 to 3. Table 2 shows the results.

(1) Redispersion Property Test

A thin coating of ink composition (0.5 g) was applied to the surface of a watch glass (φ90 mm), and the watch glass was placed in a drier that was kept at 60° C. and left for 1 hour. Then, the watch glass was taken out of the drier, and a peripheral portion of the dried ink was washed gently with a small amount of water from the outside of the peripheral portion. The state of the ink was observed and evaluated as follows.

Evaluations: ○ indicates that the ink is redispersed immediately without any aggregation; Δ indicates that aggregates in the form of a small thin film are partially generated, but not attached to the glass surface; and ? indicates that a considerable amount of aggregates is generated and remain attached to the glass surface.

(2) Continuous Ejection Stability Test

Using a commercially available large-format ink jet plotter ("JV2-130" (piezo-type) manufactured by Mimaki Engineering, Co., Ltd), continuous printing was performed under the conditions of 720×720 dpi resolution, single color, solid printing, and 1200 mm print width until some print errors such as missing dots were caused.

Evaluations: ○ indicates that no clogging occurs after 5 hours or more; Δ indicates that clogging occurs between 30 minutes and 1 hour; and ? indicates that clogging occurs within 30 minutes.

(3) Ejection Performance after Long-time Non-operation

The ink jet plotter continued to operate for 30 minutes under the above conditions, and then stopped for 48 hours. After normal cleaning, a print test was conducted again to examine whether or not printing was performed normally under the same conditions.

Evaluations: ○ indicates that normal printing can be performed by operating one head cleaning in the manner specified for the ink jet plotter; Δ indicates that several cleaning cycles are necessary; and ? indicates that further cleaning cycles are not helpful in performing normal printing.

TABLE 2

|  | Working Examples | | | | | | | Comparative Examples | | |
|---|---|---|---|---|---|---|---|---|---|---|
|  | 1 | 2 | 3 | 4 | 5 | 6 | 7 | 1 | 2 | 3 |
| Redispersion property | ○ | ○ | ○ | ○ | ○ | ○ | ○ | ? | Δ | Δ |
| Continuous ejection stability | ○ | ○ | ○ | ○ | ○ | ○ | ○ | ? | Δ | Δ |
| Ejection performance after long-time non-operation | ○ | ○ | ○ | ○ | ○ | ○ | ○ | ? | Δ | Δ |

As can be seen from the results, Working Examples are superior in redispersion property, continuous ejection stability, and ejection performance after long-time non-operation. However, Comparative Example 1, in which an anionic dispersant is used instead of the compound expressed by the chemical formula (I), is inferior in redispersion property, continuous ejection stability, and ejection performance after long-time non-operation. Comparative Examples 2 and 3, in which a nonionic dispersant is used instead of the compound expressed by the chemical formula (I), are likely to be a little bit better than Comparative Example 1, but are much worse than Working Examples of the present invention.

Comparative Example 4, in which the compound expressed by the chemical formula (I) is used without a dispersant, is not suitable for ink jet recording because of its poor storage stability.

INDUSTRIAL APPLICABILITY

An ink for ink jet recording of the present invention that uses a water-insoluble color material as a color component has the effects of not only maintaining required performances such as storage stability and high-quality recording images, but also achieving a high redispersion property, effectively preventing nozzle clogging, and ensuring stable ejection by normal cleaning both during long continuous operation and after stopping the operation of an apparatus for a long time.

Thus, the ink of the present invention is suitable for an ink for ink jet recording that uses a water-insoluble color material as a color component.

The invention claimed is:

1. An ink for ink jet recording comprising:

water;

a water-soluble organic solvent;

a water-insoluble color material, said water-insoluble color material is a disperse dye or a solvent dye;

a compound expressed by the following chemical formula:

$$R-O-(CH_2CH_2O)_n-H \qquad (I)$$

where R is an alkyl group having a carbon number of 25 to 150 and n is from 2 to 100; and a dispersant, said dispersant is an anionic surfactant different from the compound expressed by chemical formula I.

2. The ink for ink jet recording according to claim 1, wherein R is an alkyl group having a carbon number of 30 to 50 and n is from 10 to 50 in the chemical formula (I).

3. The ink for ink jet recording according to claim 1, wherein HLB of the compound expressed by the chemical formula (I) is not less than 10.

4. The ink for ink jet recording according to claim 1, wherein the water-insoluble color material is a disperse dye.

5. The ink for ink jet recording according to claim 1, wherein the dispersant is at least one selected from the group consisting of naphthalene sulfonate formaldehyde condensate, lignin sulfonates, special arylsulfonate formaldehyde condensate, creosote oil sulfonate formaldehyde condensate, and polyoxyethylene alkyl ether sulfate.

6. The ink for ink jet recording according to claim 1, wherein an amount of the compound expressed by the chemical formula (I) is 0.1 to 8 wt % with respect to a total weight of ink.

7. The ink for ink jet recording according to claim 1, wherein an amount of the water-soluble organic solvent is 5 to 50 wt %, an amount of the water-insoluble color material is 0.5 to 15 wt %, an amount of the dispersant is 0.5 to 20 wt %, and an amount of the compound expressed by the chemical formula (I) is 0.1 to 8 wt % with respect to a total weight of ink.

8. A method for producing the ink for ink jet recording according to claim 1, comprising:

preparing a predispersion including at least water, a water-insoluble color material, and a dispersant, dispersing the predispersion in a wet mill so that the water-insoluble color material is formed into fine particles having an average particle size of 0.02 to 0.2 μm; and adding the compound expressed by the chemical formula (I), a water-soluble organic solvent, and water so that an ink concentration is adjusted.

9. The method according to claim 8, wherein the predispersion further includes the compound expressed by the chemical formula (I).

* * * * *

UNITED STATES PATENT AND TRADEMARK OFFICE
CERTIFICATE OF CORRECTION

PATENT NO. : 7,641,328 B2  Page 1 of 1
APPLICATION NO. : 10/487865
DATED : January 5, 2010
INVENTOR(S) : Shunji Maekawa et al.

It is certified that error appears in the above-identified patent and that said Letters Patent is hereby corrected as shown below:

On the Cover Page:
In Item (30) Foreign Application Priority Data, change "2001-384789" to be -- 2001-384798 --

Signed and Sealed this

Twentieth Day of April, 2010

David J. Kappos
*Director of the United States Patent and Trademark Office*